United States Patent Office 3,114,739
Patented Dec. 17, 1963

3,114,739
METHOD OF CONTROLLING MOLECULAR WEIGHT USING NON-SOLVENT/SOLVENT MEDIUM IN ANIONIC POLYMERIZATION
Michael J. Vignale, Springfield, Mass., assignor to Monsanto Chemical Company, St. Louis, Mo., a corporation of Delaware
No Drawing. Filed June 30, 1959, Ser. No. 823,858
1 Claim. (Cl. 260—89.5)

This invention relates to the anionic polymerization of acrylates and methacrylates. More particularly, the invention relates to a method of controlling the molecular weights of polymers produced by the anionic polymerization of acrylates and methacrylates.

As used in this specification and in the claim, terms relating to the solvency of a reaction medium, unless otherwise qualified, are to be understood as denoting the degree of ability of the medium to dissolve the polymer produced by the reaction.

Experimentation with the use of non-solvents, non-solvent/solvent mixtures, and solvents as reaction media has shown that molecular weight control can be achieved in many polymerization reactions by proper choice of the reaction medium in accordance with the principle that a gradual increase in the solvency of the medium results in a gradual increase in the molecular weight of the polymer. However, this method of molecular weight control has been found to be inapplicable to processes for the anionic polymerization of acrylates and methacrylates, because in such processes the polymer produced in a solvent medium frequently has a molecular weight as low, or even lower, than the molecular weight of the polymer produced in a non-solvent medium.

One object of this invention is to provide an improved process for the anionic polymerization of acrylates and methacrylates.

Another object is to provide a method of controlling the molecular weights of polymers produced by the anionic polymerization of acrylates and methacrylates.

These and other objects are attained by conducting the anionic polymerization of an acrylate or methacrylate in a reaction medium consisting of a non-solvent/solvent mixture having a predetermined degree of solvency which causes precipitation of polymer chains having substantially the desired molecular weight.

The following example is given to illustrate the invention and is not intended as a limitation thereof.

*Example*

Reactions A, B, C, D, and E are conducted according to the following procedure:

(1) Methyl methacrylate is dried over calcium hydride.

(2) 20 g. of the dried monomer are dissolved in 200 ml. of a reaction medium.

(3) The monomer solution is charged to a suitable reaction vessel and purified by cooling in a Dry Ice bath under a vacuum of about 0.1 mm. of mercury.

(4) The Dry Ice bath is removed, and a 0.1 M solution of triphenylmethyl sodium in diethyl ether is added in small portions to the monomer solution at the ambient temperature (ca. 30° C.) until cessation of temperature rise indicates no further polymerization.

(5) The polymer is isolated by (reaction B–E) filtering the reaction mixture to separate the polymeric precipitate and dissolving the polymer in benzene and (reactions A–E) adding the solution of polymer in benzene to an excess of methanol to precipitate the polymer, which is then separated by filtration.

Reactions A–E differ in the reaction medium used and in the molecular weight of the polymer formed. These differences are shown in the following table:

| Reaction | Reaction Medium* | $\bar{M}_v \times 10^{-5}$** |
|---|---|---|
| A | Benzene | 0.525 |
| B | Benzene-Hexane (3:1) | 0.604 |
| C | Benzene-Hexane (1:1) | 0.671 |
| D | Benzene-Hexane (1:3) | 1.72 |
| E | Hexane | 1.02 |

*Ratios shown are volume ratios.
**Viscosity average molecular weight $\times 10^{-5}$.

The invention is applicable to the anionic polymerization of any polymerizable ester of acrylic or methacrylic acid in which the alcoholic moiety is not reactive with the anion of the catalyst. Examples of such esters are those in which the alcoholic moiety is methyl, ethyl, propyl, butyl, pentyl, hexyl, heptyl, octyl, nonyl, decyl, eicosyl, triacontyl, tetracontyl, pentacontyl, hexacontyl, phenyl, tolyl, 2-dimethylaminoethyl, 2-ethoxyethyl, o-, m-, or p-chlorophenyl, etc. Mixtures of two or more such acrylates or methacrylates may be used if desired. Presence in the alcoholic moiety of aliphatic unsaturation, primary or secondary amino groups, or halogen attached to a carbon atom of an aliphatic chain should be avoided to prevent reaction of the alcoholic moiety with the anion of the catalyst.

Any of the anionic catalysts already known to be effective in catalyzing the polymerization of acrylates and methacrylates may be utilized in the practice of this invention. Particularly suitable catalysts are the alkali metal salts of very weak acids having a pKa value greater than about 20, e.g., the Li, Na, K, Rb, and Cs salts of phenylfluorene, alpha-naphthylfluorene, phenylacetylene, indene, diphenylamine, fluorene, aniline, p-toluidine, p-anisidine, xanthane, phenylxanthane, diphenylbiphenylmethane, triphenylmethane, diphenyl-alpha-naphthylmethane, diphenylmethane, diphenylmethylethylene, cumene, etc. As in the anionic polymerization processes already known to the art, the amount of catalyst used to effect polymerization can vary over a wide range, very small amounts being effective when there is a small concentration of impurities in the polymerization system and larger amounts being required when there is a larger concentration of impurities in the system. Ordinarily the amount of catalyst used is in the range of about 0.1–5% by weight, based on the weight of monomer being polymerized.

The process of the invention is conducted in a reaction medium capable of dissolving the monomer and consisting of a mixture of an inert organic liquid which is a non-solvent for the polymer and an inert organic liquid which is a solvent for the polymer. Alkanes such as butane, pentane, hexane, heptane, etc., are particularly suitable for use as the non-solvent, and aromatic hydrocarbons such as benzene, toluene, etc., are particularly suitable for use as the solvent. However, any inert organic liquid known to be a solvent or non-solvent for polyacrylates and polymethacrylates can be used as a component of the reaction medium, the criticality being that the reaction medium must contain both a solvent and a non-solvent.

In the practice of the invention the non-solvent and solvent are employed in such proportions that the reaction medium has a predetermined degree of solvency which causes precipitation of polymer chains having substantially the desired molecular weight. Because of the different degrees in solvency of liquids within both the solvent and the non-solvent categories, the solvent/non-solvent ratio required to give a reaction medium having a specific degree of solvency varies with the particular solvent and non-solvent used but is readily ascertainable by routine experimentation. In the polymerization of methyl methacrylate, when the monomer solution comprises a benzene-hexane solution containing 10% by volume of monomer, the degree of solvency required for formation of the highest molecular weight polymers is obtained when the solvent/non-solvent volume ratio is about 1:3.

Polymerization is accomplished in a manner known to the art by dissolving the monomer in the reaction medium and contacting the monomer solution in any suitable manner with the anionic catalyst at temperatures in the range of −30° to 50° C. under atmospheric or superatmospheric pressures. For ease of operation it is preferred that the reaction mixture contain about 5–50% by weight of monomer, based on the weight of the reaction medium in which it is dissolved. Gradual addition of a solution or dispersion of the catalyst to the monomer solution is a particularly efficient manner of contacting the monomer and catalyst.

Use as reaction media of non-solvent/solvent mixtures having predetermined degrees of solvency permits molecular weight control in the anionic polymerization of acrylates and methacrylates and is additionally advantageous in that it permits formation of polymers having higher molecular weights than the polymers formed when only a solvent or only a non-solvent is used as the reaction medium in such anionic polymerization.

It is obvious that many variations may be made in the processes set forth above without departing from the spirit and scope of this invention.

What is claimed is:

In a process for polymerizing methyl methacrylate in the presence of triphenylmethyl sodium at temperatures in the range of −30° to 50° C., the improvement which comprises conducting the polymerization in a reaction medium consisting of a mixture of benzene and hexane, the volume ratio of benzene to hexane being 1:3.

References Cited in the file of this patent

UNITED STATES PATENTS

| | | |
|---|---|---|
| 2,482,056 | Elwell et al. | Sept. 13, 1949 |
| 2,608,555 | Bullitt | Aug. 26, 1952 |
| 2,841,574 | Foster | July 1, 1958 |

OTHER REFERENCES

Schildknecht: Polymer Processes, Interscience (1956), pages 175–176 and 190–191.

Wooding et al.: Anionic Polymerisation, J. Chemical Society, March 1952, pages 774–779.